United States Patent
Ahmed et al.

(10) Patent No.: US 9,742,310 B2
(45) Date of Patent: Aug. 22, 2017

(54) APPARATUS AND METHOD FOR AC TO DC ELECTRICAL CONVERSION

(71) Applicant: University of Plymouth, Devon (GB)

(72) Inventors: Mohammed Ahmed, Devon (GB); Matthew Glenn Blackler, Devon (GB)

(73) Assignee: University of Plymouth, Plymouth, Devon (GB)

( * ) Notice: Subject to any disclaimer, the term of this patent is extended or adjusted under 35 U.S.C. 154(b) by 0 days.

(21) Appl. No.: 14/902,103

(22) PCT Filed: Jul. 11, 2014

(86) PCT No.: PCT/GB2014/052124
§ 371 (c)(1),
(2) Date: Dec. 30, 2015

(87) PCT Pub. No.: WO2015/008039
PCT Pub. Date: Jan. 22, 2015

(65) Prior Publication Data
US 2016/0141976 A1 May 19, 2016

(30) Foreign Application Priority Data
Jul. 15, 2013 (GB) .................................. 1312626.3

(51) Int. Cl.
*H02M 7/217* (2006.01)
*H02M 1/42* (2007.01)
*H02M 3/04* (2006.01)

(52) U.S. Cl.
CPC ......... *H02M 7/217* (2013.01); *H02M 1/4208* (2013.01); *H02M 3/04* (2013.01); *Y02B 70/126* (2013.01)

(58) Field of Classification Search
CPC .......... H02M 7/217; H02M 1/12; H02M 1/14; H02M 1/4208; H02M 1/4225;
(Continued)

(56) References Cited

U.S. PATENT DOCUMENTS 5,627,741 A * 5/1997 Naruo ................. H02M 1/4208
363/89
5,909,364 A 6/1999 Rivet et al.
(Continued)

FOREIGN PATENT DOCUMENTS

EP 0772280 5/1997
EP 1052762 A1 12/1999
(Continued)

OTHER PUBLICATIONS

International Search Report and Written Opinion for PCT/GB2014/052124 dated Nov. 12, 2014.
British Search Report for GB1312626.3 dated Jan. 3, 2014.

*Primary Examiner* — Yemane Mehari
(74) *Attorney, Agent, or Firm* — Andrus Intellectual Property Law, LLP (57) ABSTRACT

An electrical conversion apparatus is described which comprises a bridge rectifier 10 having an input side and an output side, and a switched capacitor line 16 arranged in parallel with the output side of the bridge rectifier 10, the switched capacitor line 16 comprising a capacitance 18 and a switch 20 arranged in series with one another so that the switch 20 can control charging and discharging of the capacitance 18. A method of electrical conversion is also disclosed wherein when the output voltage of the bridge rectifier is above a threshold level 26 and is rising the switch is closed so that the capacitance charges and a load is satisfied from the output of the bridge rectifier, when the output of the bridge rectifier is above the threshold level 26 and is falling the switch is opened so that the capacitance is isolated from the load, the load still being satisfied by the output of the bridge rectifier, and when the output of the bridge rectifier is below the threshold level 26, the switch is closed so that the load is served by discharge of the capacitance. The threshold (Continued)

level 26 may be dynamically controlled, for example in response to the output of a monitor circuit 32.

14 Claims, 6 Drawing Sheets

(58) Field of Classification Search
    CPC .. H02M 1/4266; H02M 5/458; H02M 5/4585;
          H02M 3/04; H02J 9/062; Y02B 70/126
    USPC .............................................. 363/37, 48, 89
    See application file for complete search history.

(56) References Cited

U.S. PATENT DOCUMENTS

| | | | | |
|---|---|---|---|---|
| 6,038,149 A | * | 3/2000 | Hiraoka | ................ H02M 1/425 363/37 |
| 6,294,900 B1 | * | 9/2001 | Greenwood | ...... H02M 3/33584 323/222 |
| 6,483,731 B1 | * | 11/2002 | Isurin | ................ H02M 3/33592 363/125 |

FOREIGN PATENT DOCUMENTS

| | | |
|---|---|---|
| EP | 1052762 | 11/2000 |
| GB | 2261779 A | 5/1993 |
| JP | 6086553 | 3/1994 |

\* cited by examiner

Figure 1 a) Supply 12    b) Rectifier 10 output    c) Smoothed output

Theoretical Voltage

Figure 4a

Actual Voltage

Figure 4b a) Mode 1    b) Mode 2    c) Mode 3

Figure 5 a) Theoretical Current b) Actual Current

Figure 6 a) 660μF Smoothing Capacitor with 36Ω resistive load b) 660μF Switched Capacitor with 36Ω resistive load c) 68μF Switched Capacitor with 36Ω resistive load

Figure 13 a) Smoothing Capacitor with
DC-DC converter b) Switched Capacitor with
DC-DC converter

Figure 14

APPARATUS AND METHOD FOR AC TO DC ELECTRICAL CONVERSION

CROSS REFERENCE TO RELATED APPLICATIONS

The present application is the U.S. national stage application of International Application PCT/GB2014/052124, filed Jul. 11, 2014, which international application was published on Jan. 22, 2015, as International Publication WO2015/008039. The International Application claims priority of British Patent Application 1312626.3, filed Jul. 15, 2013, the contents of which are incorporated herein by reference in their entireties.

FIELD

This invention relates to an apparatus and method for use in electrical conversion, for example for use in the conversion of AC power to DC power.

BACKGROUND

Rectification arrangements for use in the conversion of AC to DC are well known. Such arrangements typically comprise a network of diodes arranged to form a bridge rectifier operable to convert an input AC voltage into a pulsed DC voltage and the magnitude of which is continuously variable as the input voltage varies. In order to smooth out some of variations in magnitude, it is common practice to place a smoothing capacitor in parallel with the bridge rectifier. Not only do such capacitors tend to be large in value, typically thousands of microfarads, but also large in physical size.

Whilst such rectifier arrangements operate satisfactorily, problems can be experienced where the supply to the associated load has to be switched, especially in medium and high power applications. Furthermore, the need to incorporate circuitry for the suppression of harmonics can be problematic. Additionally, the power factor of such arrangements tends to be low, typically in the region of 0.3-0.6.

SUMMARY

It is an objective of the invention to provide an electrical conversion apparatus and method in which many of the disadvantages associated with conventional conversion techniques are overcome or are of reduced effect.

According to a first aspect of the invention there is provided an electrical conversion apparatus comprising a bridge rectifier having an input side and an output side, and a switched capacitor line arranged in parallel with the output side of the bridge rectifier, the switched capacitor line comprising a capacitance and a switch arranged in series with one another so that the switch can control charging and discharging of the capacitance.

The switched capacitor line may further include an inductance, if desired. However, this need not always be the case.

The switch preferably comprises a bi-directional switch, for example comprising a pair of oppositely orientated uni-directional switches arranged in parallel.

The invention further relates to a method of electrical conversion comprising providing a switched capacitor line in parallel with an output of a bridge rectifier, the switched capacitor line comprising a capacitance and a switch arranged in series with one another so that the switch can control charging and discharging of the capacitance, wherein when the output voltage of the bridge rectifier is above a threshold level and is rising the switch is closed so that the capacitance charges and a load is satisfied from the output of the bridge rectifier, when the output of the bridge rectifier is above the threshold level and is falling the switch is opened so that the capacitance is isolated from the load, the load still being satisfied by the output of the bridge rectifier, and when the output of the bridge rectifier is below the threshold level, the switch is closed so that the load is served by discharge of the capacitance.

Where the switch comprises a pair of oppositely orientated uni-directional switches arranged in parallel with, for example, diodes controlling the current flow direction, it will be appreciated that the individual ones of the switches need not always occupy the same position of one another for the switch as a whole to operate in the manner set out above. Each uni-directional switch may comprise, for example, a suitable switching device such as, but not limited to, a MOSFET or IGBT The conversion apparatus and method set out hereinbefore are advantageous compared to a typical conversion apparatus in that the power factor associated with the operation thereof is significantly increased. By way of example, the power factor may be of the order of 0.895. However, this represents the power factor of one example, not an achievable upper limit for the power factor.

The capacitance may be considerably smaller than the smoothing capacitor of a typical conversion apparatus. By way of example, it can be as low as 10% of the size of a typical smoothing capacitor. Accordingly, component cost savings, as well as size reductions, can be made compared to a typical arrangement.

A further advantage of the apparatus and method of the invention is that the generation of harmonics in the current waveform is comparably low. Accordingly, employing the apparatus and method of the invention in the conversion of a power supply for an electrical or electronic device is relatively simple as there is no need to incorporate circuitry to accommodate or remove such harmonics.

The operation of the switch may be controlled using any suitable control arrangement. As its operation will be synchronized with the output of the bridge rectifier which, in turn, is synchronized to the input thereof, the operation of the switch may be synchronized to the input or output of the bridge rectifier. Alternatively, the output voltage from the bridge rectifier may be monitored and compared with the threshold level to determine the desired switch position, and the position of the switch adjusted accordingly.

The switch will typically need to be capable of switching at high potential. As described hereinbefore, the switch is opened to stop charging of the capacitance, and maintain the charge therein, as the output from the bridge rectifier reaches its peak. It is then subsequently closed to allow the load to be satisfied from the capacitance when the capacitor charge is high.

BRIEF DESCRIPTION OF THE DRAWINGS

The invention will further be described, by way of example, with reference to the accompanying drawings, in which:

FIG. 14 is a comparison of test results showing the actual input current harmonics of the electrical apparatus in FIG. 1 versus the electrical apparatus in FIG. 13, FIG. 14a illustrating test results showing the input current harmonics of the electrical apparatus in FIG. 1 with a DC-DC converter connected to the output and supplying a resistive load, and FIG. 14b illustrating test results showing the input current harmonics of the electrical apparatus in FIG. 13 with the same load as in FIG. 8a.

DETAILED DESCRIPTION OF THE DRAWINGS

Figure 1:
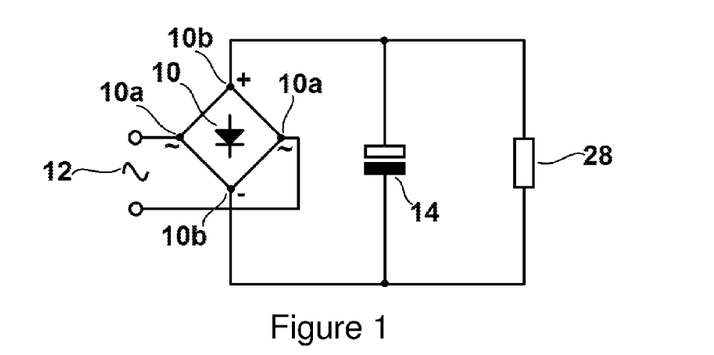
FIG. 1 is a circuit diagram illustrating a typical electrical conversion apparatus.
Figure 2:
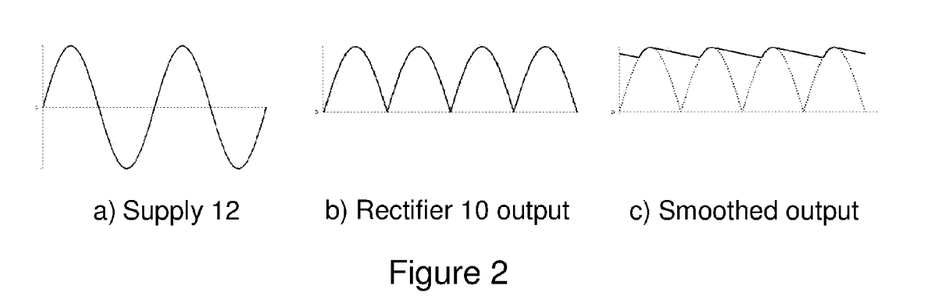
FIG. 2 is a diagrammatic representation of waveforms to assist in understanding the operation of the circuit of FIG. 1.

Referring firstly to FIG. 1, a typical AC/DC electrical conversion circuit arrangement is illustrated. The arrangement comprises a bridge rectifier 10, made up of a network of diodes (or switches with a control apparatus), to which an input voltage from an AC supply 12 is applied in the usual manner. FIG. 2a illustrates, diagrammatically, the output from the supply 12 which is applied to the input side 10a of the bridge rectifier 10, and FIG. 2b illustrates the output of a bridge rectifier (in the absence of any smoothing) in response to such an input. The bridge rectifier 10 thus serves to convert the AC supply 12 to a DC output of varying magnitude.

In order to render the DC output of the bridge rectifier 10 of greater use, it is common practice to provide a smoothing capacitor 14 in parallel with the output side 10b of the bridge rectifier 10. The capacitance of the capacitor 14 is typically large. The capacitor 14 charges and discharges, smoothing the output signal, for example to substantially the form illustrated in FIG. 2c. It will be appreciated that whilst the output of the conversion circuit including the capacitor 14 is in the form of a DC output, there is still a significant output ripple, the size of which is determined, in part, by the capacitor 14.

Electrical conversion using circuits of this general type has been used for many years. One disadvantage with the use of such a circuit is that the power factor of the circuit is low, for example typically in the region of 0.3-0.6. Furthermore, the presence of the large capacitor 14 results in the generation of large current harmonics in the supply, which can interfere with the operation of other circuits if not compensated for or suppressed.

Figure 3:
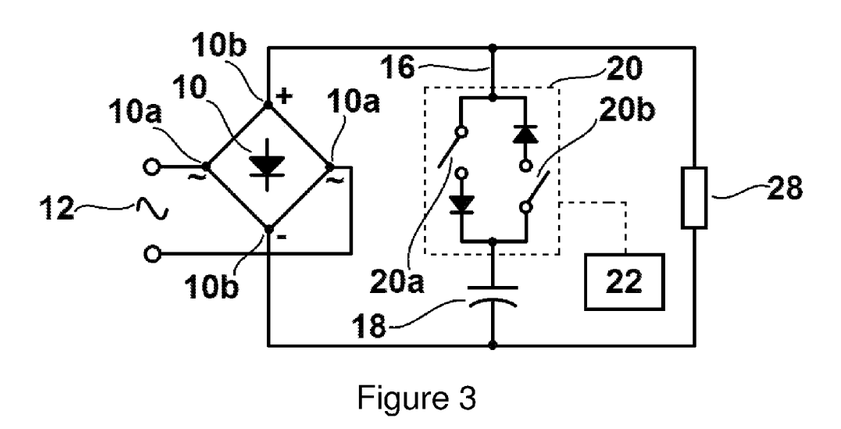
FIG. 3 is a circuit diagram illustrating an electrical conversion apparatus in accordance with one embodiment of the invention.

An electrical conversion circuit arrangement in accordance with one embodiment of the invention is illustrated in FIG. 3. At first sight the circuit of FIG. 3 appears to be very similar to that of FIG. 1. However, there is an important distinction therebetween. Specifically, the large smoothing capacitor 14 of the arrangement of FIG. 1 is omitted and is replaced with a switched capacitor line 16. The switched capacitor line 16 incorporates a capacitance 18 which is considerably smaller than a typical smoothing capacitor 14. By way of example, in the arrangement illustrated the value of capacitor 18 is less than 100 μF. However, it will be appreciated that the invention is not restricted in this regard and that other component values may be used. Furthermore, it includes a bi-directional switch 20. The switch 20 is operable to control the timing of charging and discharge of the capacitance 18.

It is known that the presence of a large smoothing capacitor 14 in a typical electrical conversion circuit results in the generation of significant current harmonics which can negatively impact upon the operation of other circuits or devices and so require removal. By avoiding the use of such a capacitor, the generation of current harmonics is significantly reduced.

As the switch 20 is controlling both charging and discharge, ideally the switch 20 is a bi-directional switch. In the arrangement illustrated, the bi-directional switch comprises a pair of oppositely orientated uni-directional switch legs, each of which includes both a uni-direction switch 20a, 20b and an appropriately orientated diode or the like. A control arrangement 22 is provided to control the operation of the switch 20, controlling the position of each of the uni-directional switches 20a, 20b, and thereby controlling charging and discharging of the capacitance 18.

Figure 4A:
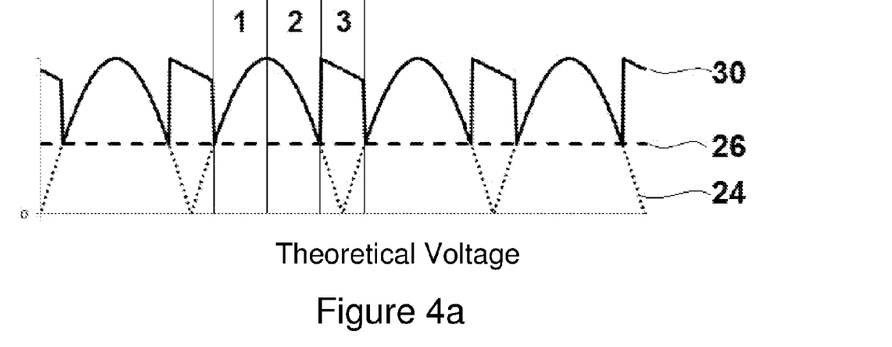
FIG. 4a is a diagram illustrating the theoretical output voltage of the electrical conversion apparatus of FIG. 3.

FIG. 4a illustrates the typical output 24 of the bridge rectifier 10 in response to the application of an AC signal at the input thereof from the supply 12. It will be appreciated that, as described hereinbefore, the output 24 is in the form of a DC signal of varying magnitude. Also shown on FIG. 4a is a threshold level 26. In FIG. 4a, three operating modes are indicated. In Mode 1, the bridge rectifier output 24 is greater than the threshold 26 and is rising, in Mode 2 the bridge rectifier output 24 is above the threshold 26 but is falling, and in Mode 3 the bridge rectifier output 24 is below the threshold 26.

Figure 5:
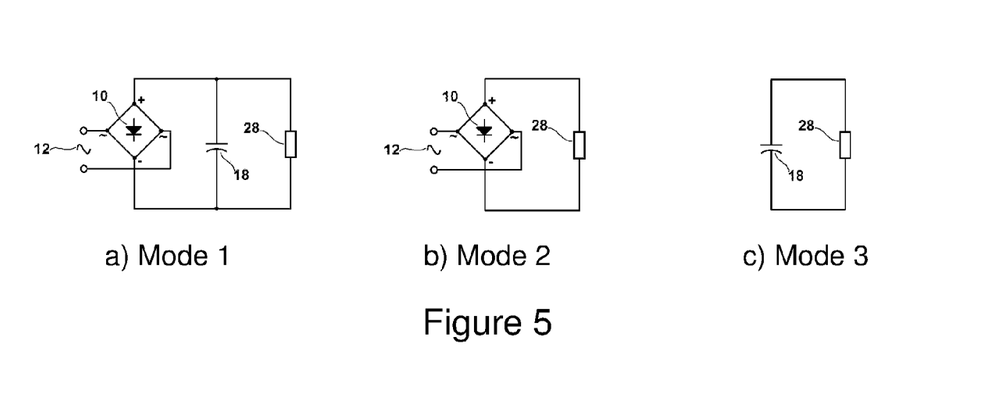
FIG. 5 is a series of circuit diagrams illustrating the effective circuit operable for each of the three modes of operation of the electrical apparatus in FIG. 3.

Also shown in FIG. 4a is the output voltage 30 of the electrical apparatus shown in FIG. 3. The control arrangement 22 is operable to control the position of the switches 20a, 20b so that:

during Mode 1 the load 28 (denoted by a resistor in FIG. 3) is satisfied from the output of the bridge rectifier 10 and the switch 20a is closed so that charging of the capacitance 18 takes place. The switch 20b is open in this mode, but the net result of the positions of the switches 20a, 20b is that the switch 20 is closed. FIG. 5a shows the effective circuit operable during Mode 1.

during Mode 2 the load 28 continues to be satisfied from the output of the bridge rectifier 10, but the switches 20a, 20b are both opened so that the capacitance 18 is held in its charged condition. As both of the switches 20a, 20b are open, the overall condition of the switch 20 is that it is open. FIG. 5b shows the effective circuit operable during Mode 2.

during Mode 3 the switch 20b is closed allowing the load 28 to be satisfied from the discharge of the capacitance 18. The switch 20a remains open in this mode, but as switch 20b is closed, the net effect is that the switch 20, overall, is closed. FIG. 5c shows the effective circuit operable during Mode 3.

The control arrangement 22 conveniently operates by continuously monitoring the bridge rectifier output 24, determining if it is rising or falling, and comparing it with the desired output threshold 26 to determine which of the three operating modes is appropriate, and controlling the switches 20a, 20b accordingly. However, provided the supply voltage is of a stable frequency and magnitude, the cyclical nature of the operation of the switches 20a, 20b may allow other control strategies to be used. Furthermore, as set out below, where by supply voltage is varying, other control strategies may be used.

Figure 4B:
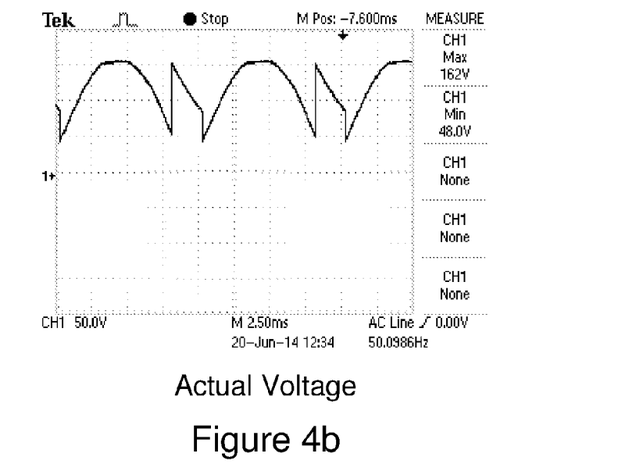
FIG. 4b is a view illustrating the actual output voltage of the electrical conversion apparatus of FIG. 3.

FIG. 4b shows the actual output voltage of the electrical apparatus in FIG. 3 when tested with an AC input of 110V rms. The threshold 26 in this case was set to 48V.

Figure 6:
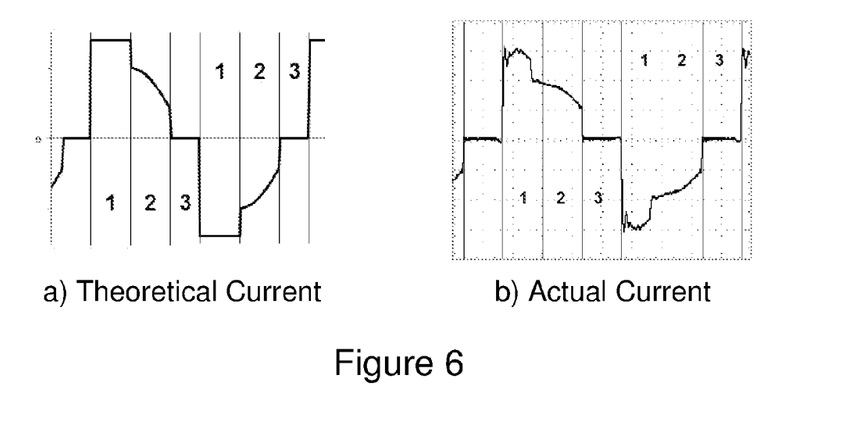
FIG. 6a is a view illustrating the theoretical impact of harmonics upon the input current.
FIG. 6b is a view illustrating test results showing the actual impact of harmonics upon the input current.

FIG. 6a is a diagrammatic representation of the applied input current supplied to the electrical conversion circuit of FIG. 3. It will be appreciated that the input current includes segments which correspond with the three modes identified hereinbefore. In Mode 1, the applied input current is high. It is illustrated in FIG. 6a as taking the form of a square wave. In practice this will often not be the case, depending to some extent upon the nature of the load 28. As mentioned hereinbefore, during this mode, the switch 20a is closed and so charging of the capacitance 18 is taking place as well as the load 28 being supplied. During Mode 2, when the switches 20a, 20b are both open, the supplied current is of part sinusoidal form, reflecting the nature of the input voltage. During Mode 3 when the switch 20b is closed to allow the load 28 to be satisfied from the discharge of the capacitance 18, the supplied current is zero. Whilst FIG. 6a is a theoretical representation of the input current, FIG. 6b illustrates the actual impact of harmonics on the input current in a test arrangement.

By correctly identifying the durations of the various modes, the rms input current value can be calculated. In one example, where the supply is a 110V rms supply and the load 28 is a resistive load of 36Ω, the rms input current value can be calculated to be approximately 3.9 A. Calculation or determination of the volt-ampere value and average instantaneous power value permits the power factor to be calculated as approximately 0.94. Such a circuit using these values was built and tested, confirming the validity of the calculations with a power factor measured at 0.936. This represents a significant enhancement over the 0.3-0.6 power factor values typically achieved by electrical conversion circuits. It is important to note that the apparatus is not restricted to the above supply voltage. Instead, the maximum supply voltage which may be applied is limited only by the ratings of the switching elements employed.

Figure 7:
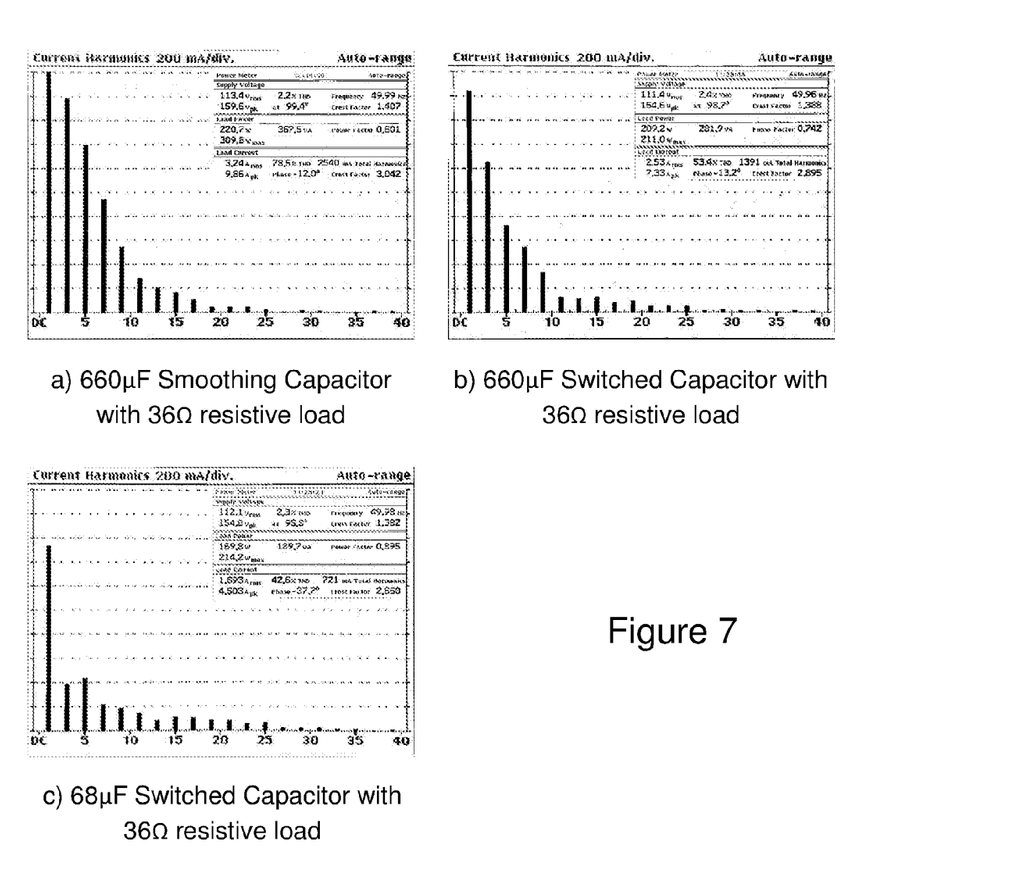
FIG. 7 is a comparison of test results showing the input current harmonics for three different circuit configurations, FIG. 7a illustrating test results showing the actual input current harmonics of the electrical apparatus in FIG. 1 with a 660 μF smoothing capacitor 14 and a 36Ω load 28, FIG. 7b illustrating test results showing the actual input current harmonics of the electrical apparatus in FIG. 3 with a 660 μF switched capacitor 18 and a 36Ω load 28, and FIG. 7c illustrating test results showing the actual input current harmonics of the electrical apparatus in FIG. 3 with a 68 μF switched capacitor 18 and a 36Ω load 28.

FIG. 7 illustrates the comparison of three test results, each from different circuit configurations, showing the possible improvement in current harmonics over that of the apparatus in FIG. 1:

FIG. 7a illustrates a test result of the actual input current harmonics of the electrical apparatus in FIG. 1 with a smoothing capacitance 14 of 660 µF and a resistive load 28 of 36Ω.

FIG. 7b illustrates a test result of the actual input current harmonics of the electrical apparatus in FIG. 3 with a switched capacitance 18 of 660 µF and a resistive load 28 of 36Ω. This shows the improvement in current harmonics and power factor over FIG. 7a of using a switched capacitance.

FIG. 7c illustrates a test result of the actual input current harmonics of the electrical apparatus in FIG. 3 with a switched capacitance 18 of 68 µF and a resistive load 28 of 36Ω. This shows the improvement in current harmonics and power factor over FIG. 7b of using a smaller capacitance.

The load 28 was identical for all tests illustrated in FIG. 7.

The arrangement of the invention is thus advantageous in that it allows a significant increase in power factor to be achieved, and current harmonic generation is suppressed. These effects are achieved without the need to incorporate switches into the supply current to the load 28. Accordingly, the invention may be of particular benefit when used in medium and high power applications in which the incorporation of switches in these locations can be problematic. Whilst the benefits of the invention are achieved without the need to incorporate switches into the supply, the invention may be employed in conjunction with such a supply, if desired.

It will be appreciated that the threshold 26 is chosen, to some extent, depending upon the application in which the invention is to be used, but it also impacts upon the size of the capacitance 18. The higher the threshold 26, the larger the capacitance 18 is required to be, and the lower the threshold 26, the smaller the capacitance 18.

Figure 8:
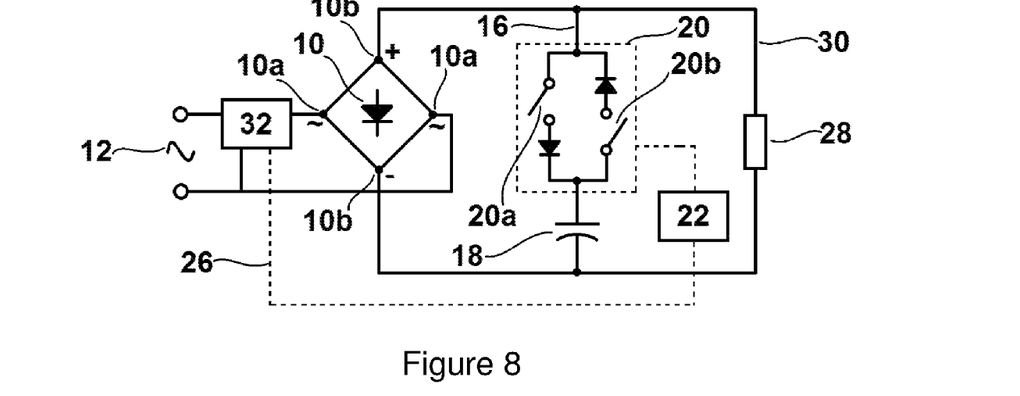
FIG. 8 is a circuit diagram illustrating an electrical conversion apparatus in accordance with a further embodiment of the invention.

FIG. 8 illustrates a modification to the circuit of FIG. 3. In the circuit shown in FIG. 8, a monitoring circuit 32 is provided to monitor the supply 12, the output of the monitoring circuit 32 being supplied to the control unit 22 and used in controlling the operation of the switch 20. By the use of such an arrangement, the magnitude of the threshold 26 can be varied, for example in response to variations in the supply 12 as detected by the monitoring circuit 32. Such an arrangement, therefore, allows dynamic control over the value of the threshold 26 and thereby over the operation of the apparatus as a whole, for example to allow maximisation of the power factor or power throughput achievable. This may be particularly advantageous where the load is not constant and/or is not purely resistive in nature.

Whilst FIG. 8 illustrates the monitoring circuit 32 as monitoring the supply 12, it will be appreciated that it may additionally or alternatively monitor the output from the rectifier, and use that in the determination of an appropriate threshold level 26 and/or in the control of the switch 20.

Figure 9:
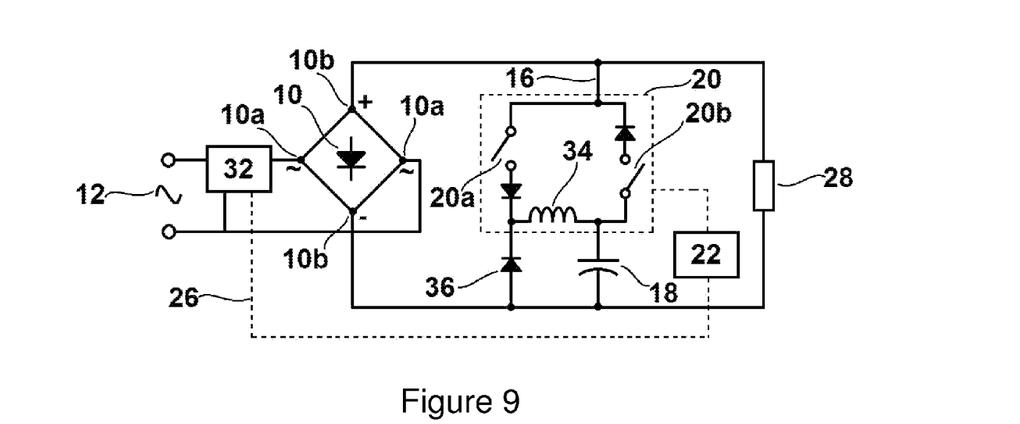
FIG. 9 is a circuit diagram illustrating an electrical conversion apparatus in accordance with a further embodiment of the invention.
Figure 10:
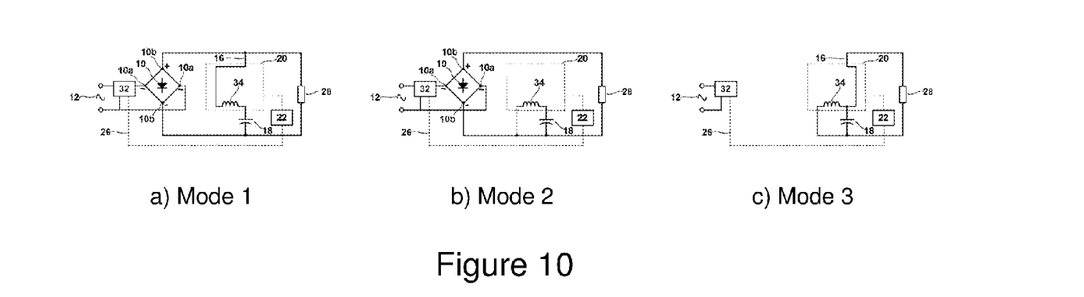
FIG. 10 is a series of circuit diagrams illustrating the effective circuit operable for each of the three modes of operation of the electrical apparatus in FIG. 9.

A modification of the circuit of FIG. 8 is shown in FIG. 9. In the arrangement of FIG. 9 an inductor 34 or other energy storage device is connected to the capacitor 18, with a freewheeling diode 36 connected across the capacitor 18 and in series with the inductor 34. The arrangement of FIG. 9 is operated in substantially the same manner as described hereinbefore. Namely:

during Mode 1 the load 28 (denoted by the resistor 28 in FIG. 9) is satisfied from the output of the bridge rectifier 10 and the switch 20a is closed so that charging of the capacitance 18 takes place. In the embodiment shown in FIG. 9, this mode will also store energy in the inductor 34. The switch 20b is open in this mode. FIG. 10a shows the effective circuit operable during mode 1. Mode 1 thus stores energy in one or more energy storage devices.

during Mode 2 the load 28 continues to be satisfied from the output of the bridge rectifier 10, but the switches 20a, 20b are both opened so that the capacitance 18 is held in its charged condition. In the embodiment shown in FIG. 9, in this mode the inductor energy is partially or completely transferred to the capacitor. FIG. 10b shows the effective circuit operable during mode 2.

during Mode 3 the switch 20b is closed allowing the load 28 to be satisfied from the discharge of the capacitance 18. In the embodiment shown in FIG. 9, stored energy from the inductor could also be used to supply the load in addition to the energy from the capacitor. The switch 20a remains open in this mode. FIG. 10c shows the effective circuit operable during mode 3.

Figure 11:
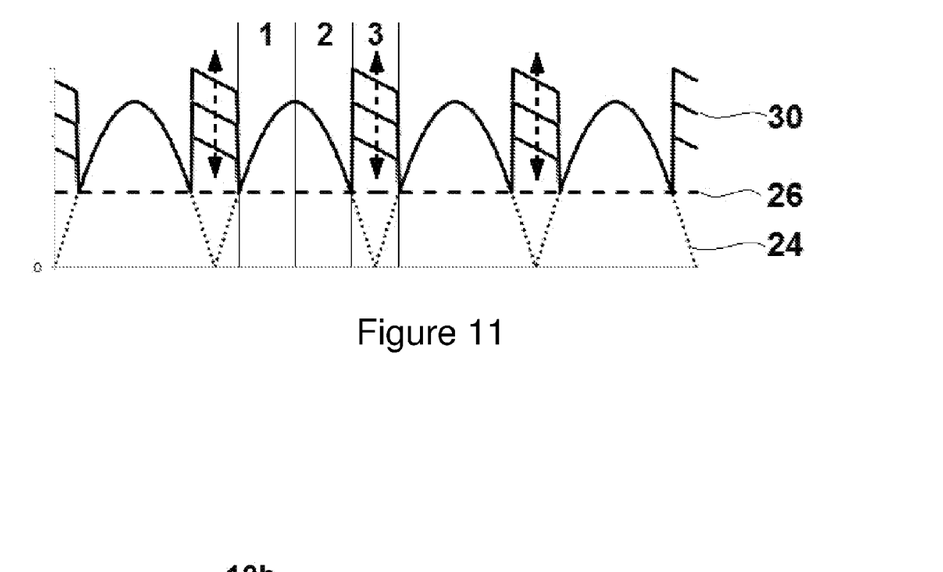
FIG. 11 is a diagram illustrating the theoretical output voltage of the electrical conversion apparatus of FIG. 9 showing the effect of an additional storage component 34 on the voltage in mode 3.

The arrangement of FIG. 9 may result in the potential across the load 28 in Mode 3 exceeding the peak potential of the AC supply as illustrated in FIG. 11. Alternatively, with appropriate sizing of the inductor 34, the energy transfer rate may be designed to be such that there is less energy in the storage elements, resulting in the peak potential during Mode 3 being less than the peak potential of the AC.

It is thought that the arrangement of FIG. 9 would be particularly suitable for use in conjunction with higher frequency supplies, for example such as those used on aircraft, as the higher frequencies would allow the use of a smaller inductor.

Figure 12:
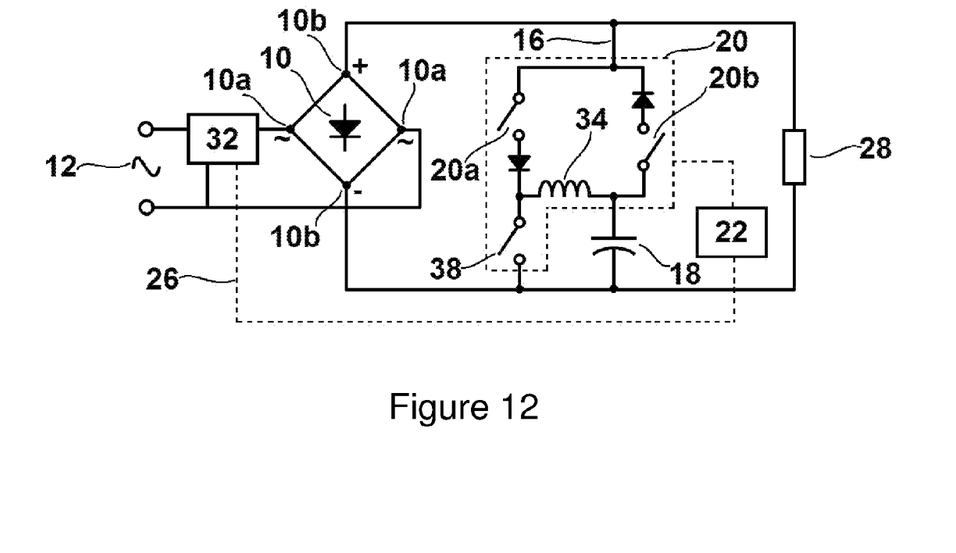
FIG. 12 is a circuit diagram illustrating an electrical conversion apparatus in accordance with a further embodiment of the invention.

An electrical conversion circuit arrangement in accordance with a further embodiment of the invention is illustrated in FIG. 12. The circuit of FIG. 12 is similar to that of FIG. 9, but the freewheeling diode 36 shown in FIG. 9 is omitted and replaced with another switching device 38, also operated by the control arrangement 22. Operation of the arrangement of FIG. 12 is substantially as hereinbefore described with reference to FIG. 9 with the exception that the switch 38 is controlled by the control arrangement 22 so as to be open during Mode 1 and closed during Modes 2 and 3, thereby operating in substantially the same fashion as the freewheeling diode 36 of the FIG. 9 arrangement.

Figure 13:
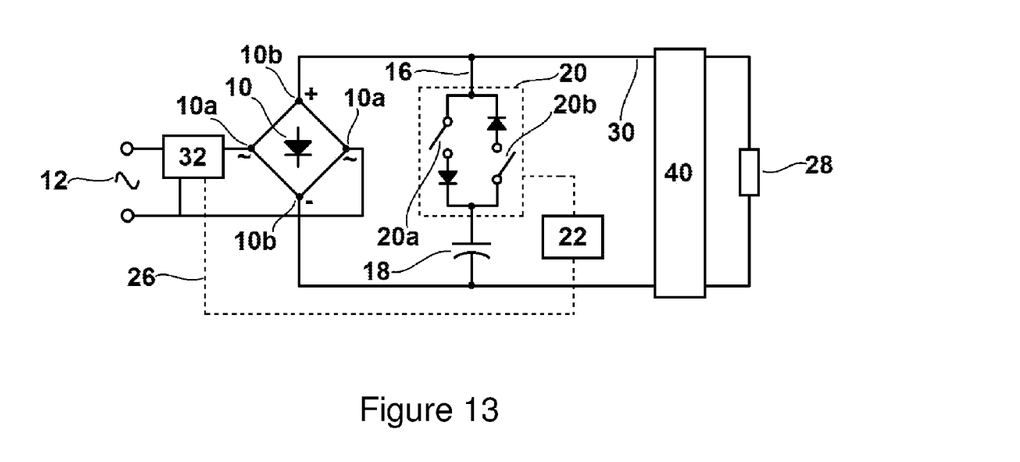
FIG. 13 is a circuit diagram illustrating an electrical conversion apparatus in accordance with a further embodiment of the invention.

An electrical conversion circuit arrangement in accordance with a further embodiment of the invention is illustrated in FIG. 13. In the arrangement of FIG. 13, a DC-DC converter 40 is connected in parallel with the outputs 10b of the rectifier 10 and also in parallel with the switched capacitor line 16. The purpose of DC-DC converter 40 is to assist in the stabilisation of the rectifier output voltage, thusly holding the output to the load 28 at a flat DC voltage. Depending on the topology of DC-DC converter 40, the flat DC output across the load may be larger or smaller than the threshold 26.

Figure 14:
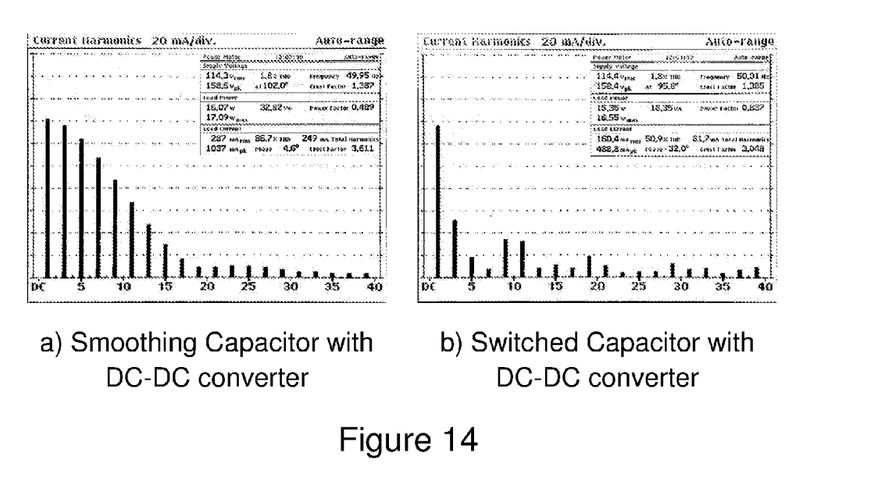

FIG. 14 illustrates the comparison of two test results, showing the possible improvement in current harmonics of the apparatus in FIG. 13 over that of the apparatus in FIG. 1:

FIG. 14a illustrates a test result of the actual input current harmonics of the electrical apparatus in FIG. 1 with a smoothing capacitance of 660 µF and a DC-DC converter connected to the output 10b of the rectifier 10 and supplying the load 28.

FIG. 14b illustrates a test result of the actual input current harmonics of the electrical apparatus in FIG. 13 with a switched capacitance 18 of 68 µF and an identical load 28 to that of FIG. 14a. The DC-DC converter used for the test shown in FIG. 14a is identical to the DC-DC converter 40 in FIG. 13. FIG. 14b shows the improvement in current harmonics and power factor over FIG. 14a.

The load 28 was identical for both tests illustrated in FIG. 14 and comprised of a laptop computer running a Linux operating system whilst performing a severe stress test. The output of the DC-DC converter used for both tests was set to 19V.

Whilst the circuits of FIGS. 9, 12 and 13 all make use of the modification shown in FIG. 8, it will be appreciated that embodiments based including the variants of FIGS. 9, 12 and 13 but based upon the circuit of FIG. 3 are also possible.

Whilst certain specific embodiments of the invention are described hereinbefore with reference to the accompanying drawings, it will be appreciated that a wide range of modifications and alterations thereto are possible without departing from the scope of the invention as defined by the appended claims.

By way of acknowledgement, development work in relation to the subject matter of the application, and in particular the embodiments illustrated in FIGS. 8 to 13, and testing of the invention has been undertaken in conjunction with, and with the kind assistance of, Fairford Electronics Ltd of Ivybridge, United Kingdom.

The invention claimed is:

1. An electrical conversion apparatus for use in satisfying the requirement of a load, the apparatus comprising a bridge rectifier having an input side and an output side, the load being connected to the output side of the bridge rectifier, a switched capacitor line arranged in parallel with the output side of the bridge rectifier and the load, the switched capacitor line comprising a capacitance and a switch arranged in series with one another so that the switch can control charging and discharging of the capacitance, and a control arrangement operable to control the operation of the switch, wherein the control arrangement is operable such that whenever the output voltage of the bridge rectifier is above a threshold level and is rising the switch is closed so that the capacitance charges and the load is satisfied from the output of the bridge rectifier, whenever the output of the bridge rectifier is above the threshold level and is falling the switch is opened so that the capacitance is isolated from the load, the load still being satisfied by the output of the bridge rectifier, and whenever the output of the bridge rectifier is below the threshold level, the switch is closed so that the load is served by discharge of the capacitance supplementing the output from the bridge rectifier.

2. The apparatus according to claim 1, wherein the threshold level is fixed.

3. The apparatus according to claim 1, wherein the threshold level is variable.

4. The apparatus according to claim 3, further comprising a monitoring arrangement operable to monitor a supply to the input side and/or an output at the output side, and wherein the threshold level is dynamically controlled in response to the operation of the monitoring arrangement.

5. The apparatus according to claim 1, further comprising an additional energy storage element arranged in series with the capacitance.

6. The apparatus according to claim 5, further comprising a freewheeling diode connected in series with the energy storage element.

7. The apparatus according to claim 5, further comprising a switch connected in series with the energy storage element.

8. The apparatus according to claim 5, wherein the energy storage element comprises an inductor.

9. The apparatus according to claim 1, further comprising a DC-DC converter operable to provide a stabilised DC output waveform.

10. The apparatus according to claim 1, wherein the switch comprises a bi-directional switch.

11. The apparatus according to claim 10, wherein the bi-directional switch comprises a pair of oppositely orientated uni-directional switches arranged in parallel.

12. The apparatus according to claim 11, wherein each uni-directional switch comprises a suitable switching device such as, but not limited to, a MOSFET or IGBT.

13. A method of electrical conversion comprising providing a switched capacitor line in parallel with an output of a bridge rectifier, a load being connected to the output of the bridge rectifier and the switched capacitor line being arranged in parallel with the load, the switched capacitor line comprising a capacitance and a switch arranged in series with one another so that the switch can control charging and discharging of the capacitance, wherein whenever the output voltage of the bridge rectifier is above a threshold level and is rising the switch is closed so that the capacitance charges and the load is satisfied from the output of the bridge rectifier, whenever the output of the bridge rectifier is above the threshold level and is falling the switch is opened so that the capacitance is isolated from the load, the load still being satisfied by the output of the bridge rectifier, and whenever the output of the bridge rectifier is below the threshold level, the switch is closed so that the load is served by discharge of the capacitance supplementing the output from the bridge rectifier.

14. The method of electrical conversion according to claim 13, further comprising the measurement of the AC input and/or DC output in order to dynamically generate the threshold level used to control the switch.

* * * * *